United States Patent [19]

Linden et al.

[11] 4,366,193

[45] Dec. 28, 1982

[54] CATECHOL-BASED VAPOR PERMEATION CURABLE COATING COMPOSITIONS

[75] Inventors: Gary L. Linden, Upper Arlington, Ohio; Shiraz A. Kathiriya, Irvine, Calif.

[73] Assignee: Ashland Oil, Inc., Dublin, Ohio

[21] Appl. No.: 252,844

[22] Filed: Apr. 10, 1981

[51] Int. Cl.$^3$ .............................................. B05D 3/04
[52] U.S. Cl. ..................................... 427/340; 525/75; 525/131; 525/440; 528/53; 528/79; 528/44; 524/873; 524/871; 524/875
[58] Field of Search .................. 427/340; 260/31.2 N, 260/31.4 R, 31.8 T, 31.8 XA; 525/131, 440, 75

[56] References Cited

U.S. PATENT DOCUMENTS

| | | | |
|---|---|---|---|
| 2,657,151 | 10/1953 | Gensel et al. | 427/340 |
| 2,967,117 | 1/1961 | Ariedter | 427/340 |
| 3,409,579 | 11/1968 | Robins | 260/30.4 |
| 3,429,848 | 2/1969 | Robins | 260/38 |
| 3,676,392 | 7/1972 | Robins | 260/38 |
| 3,789,044 | 1/1974 | Taft et al. | 260/18 TN |
| 3,822,226 | 7/1974 | Taft et al. | 260/18 TN |
| 3,836,491 | 9/1974 | Taft et al. | 260/22 TN |
| 3,874,898 | 4/1975 | McInnes | 427/340 |
| 3,933,727 | 1/1976 | Schmid | 260/37 N |
| 4,179,427 | 12/1979 | Gardikes | 260/29.2 TN |

FOREIGN PATENT DOCUMENTS 1351881 5/1974 United Kingdom .
1369351 10/1974 United Kingdom .

OTHER PUBLICATIONS

Taft et al., "Vapor Permeation Curing", in *Fatipec Congress*, 11, 1972, pp. 335-342.

Primary Examiner—Norman Morgenstern
Assistant Examiner—Janyce A. Bell
Attorney, Agent, or Firm—Mueller and Smith

[57] ABSTRACT

Disclosed is a coating composition rapidly curable at room temperature in the presence of a vaporous tertiary amine catalyst which comprises catechol or a catechol derivative, a multi-isocyanate curing agent, and preferably a fugitive organic solvent.

18 Claims, No Drawings

CATECHOL-BASED VAPOR PERMEATION CURABLE COATING COMPOSITIONS

BACKGROUND OF THE INVENTION

The present invention relates to phenol-functional resins cured with isocyanate cross-linking agents and more particularly to such a system which is curable in the presence of a vaporous tertiary-amine catalyst.

Vapor Permeation Cure (VPC) has been proposed on a limited basis by the prior art. For example, U.S. Pat. No. 2,967,117 shows a coating composed of a polyhydroxy polyester and a polyisocyanate which are cured in the presence of a gaseous tertiary amine or phosphine. The polyester contains aliphatic hydroxyl groups and heating of the coated substrate at about 60°–120° C. prior to or concomitant with the vaporous tertiary amine exposure is taught in the specification and examples. U.S. Pat. No. 3,874,898 shows a coating composed of a polymer containing only isocyanate functionality which can be cured in the presence of a vaporous amine. VPC technology additionally has been used for curing foundry binder compositions of a phenol-aldehyde resin (U.S. Pat. No. 3,409,579). Relative to the benzylic ether phenolic resin disclosed therein, reference also is made to U.S. Pat. Nos. 3,485,797, 3,676,392, and 3,501,552. For coatings applications, a hydroxy functional polyester may be end-capped with hydroxybenzoic acid as taught in U.S. Pat. No. 3,836,491, a phenol reacted with an unsaturated fatty acid or the like as taught in U.S. Pat. No. 3,822,226, or an epoxy polymer capped with hydroxybenzoic acid as taught in U.S. Pat. No. 3,789,044. British Pat. No. 1,351,881 modifies a polyhydroxy, polyepoxy, or polycarboxyl resin with the reaction product of a phenol and an aldehyde. The reaction product is curable with an isocyanate cross-linking agent in the presence of a vaporous tertiary amine. British Pat. No. 1,369,351 proposes a hydroxy or epoxy compound which has been reacted with diphenolic acid. The resulting compound is curable with a polyisocyanate according to VPC techniques.

In the coating compositions proposed by the foregoing art, the phenol-functionality is provided by the reaction of carboxyl functionality contained with the phenol group, e.g. hydroxybenzoic acid, diphenolic acid, and the like. The present invention, however, is directed to synthesis of compounds containing phenol-functionality for VPC coatings where hydroxyl functionality contained with the phenol group is utilized in the synthesis schemes. While such synthesis would appear to be capable of easy reduction to practice, several unexpected impediments in the synthesis schemes was uncovered during research to develop the present invention as will be more fully set forth herein.

BROAD STATEMENT OF THE INVENTION

The present invention relates to coating compositions which are rapidly curable in the presence of a vaporous tertiary-amine catalyst at room temperature. The coating composition comprises a phenol-functional compound (substituted or unsubstituted 1,2-dihydroxybenzene or a derivative thereof) represented by the following general structure:

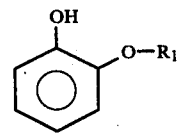

where $R_1$ is H or an organic group; a multi-isocyanate curing agent comprising between about 10% and 100% by weight of an aromatic multi-isocyanate and between about 0% and 90% by weight of an aliphatic multi-isocyanate; and preferably a fugitive organic solvent therefor. An advantageous catechol-derived, phenol-functional compound for the coating composition can be represented by the following general structure:

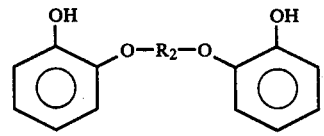

where $R_2$ is a divalent organic group such as a polyester.

Another advantageous catechol-derived, phenol-functional compound for the coating composition can be represented by the general structure:

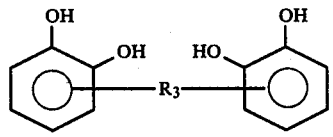

where $R_3$ is a divalent organic group.

Another aspect of the present invention is a method for coating a substrate with a coating composition. Such method comprises:

a. applying a film of said coating composition to said substrate, said coating composition comprising a catechol-derived, phenol-functional compound represented by the above general structures (I), (II), and (III); a multi-isocyanate curing agent comprising between about 10% and 100% by weight of an aromatic multi-isocyanate and between about 0% and 90% by weight of an aliphatic multi-isocyanate; and preferably a fugitive organic solvent therefor;

b. exposing said coated substrate to a vaporous tertiary-amine catalyst to rapidly cure said applied film of said coating composition.

Advantages of the present invention include the ability to cure a coating composition at room temperature in rapid fashion. Another advantage is the ability to formulate extremely inexpensive coating compositions ideally suited as a base coat for fiberboard or like substrates where high throughput is obtained without the necessity for baking the coating. These and other advantages will become readily apparent to those skilled in the art based upon the disclosures contained herein.

DETAILED DESCRIPTION OF THE INVENTION

The preferred phenol capping agent used for synthesizing the phenol-functional compounds of the present invention is catechol (1,2-dihydroxybenzene). The use of catechol as the phenol-functional compound or polymers based on catechol is truly unique for VPC technology. This uniqueness is underscored with the realization that under substantially equivalent conditions, resorcinol (1,3-dihydroxybenzene) and hydroquinone (1,4-dihydroxybenzene) do not react with isocyanate curing agents in the presence of vaporous tertiary-amine catalysts, whereas catechol will rapidly react with the isocyanate curing agents under such conditions. The uniqueness of catechol in VPC coatings technology is unexpected and not fully understood. Without intending to be limiting, it is believed that the position of the two hydroxyl groups ortho to one another permits hydrogen bonding interaction which accelerates the curing process.

Another unique contribution which catechol and its derivatives display in VPC coatings is the relative unreactivity of such aromatic hydroxyl groups with isocyanate groups in the absence of a catalyst. Thus, catechol and catechol-based compounds can be directly admixed with isocyanate curing agents suitably in a solvent therefor, and such mixture remains a non-gelled liquid for time periods in excess of 4 hours and on up to 10 hours or more at room (ambient) temperature. Such an excellent pot life of the coating composition is extremely important in commercial practice of the invention where it is highly advantageous for the coating composition to display a pot life of at least one-half of a shift (e.g. 4 hours) and desirably at least one shift so that workers in the plant do not have to stop and formulate coating compositions at frequent intervals during their shift. The coating composition of the present invention provides a pot life which meets or exceeds commercial expectations therefor. Notwithstanding such relative unreactivity with isocyanate curing agents in the pot, catechol and catechol-based compounds rapidly react with such isocyanate curing agents in the presence of the catalyst in very rapid fashion. Thus, an applied film of the coating composition can be cured in the presence of a vaporous tertiary-amine catalyst in as short an exposure time as 15–30 seconds at room temperature.

The most elementary form of the catechol-derived phenol-functional compound of the present invention is catechol itself. In admixture with polymeric multi-isocyanate curing agents, catechol does provide a coating composition which can be ideally suited for use as a base coat, especially where color is relatively unimportant and where reduced costs are important. Note that catechol may be substituted with other groups, e.g. hydroxyl, nitrile, alkyl, etc. Catechol also may be physically blended with other polyphenol-functional polymers or resins and the multi-isocyanate curing agent for forming VPC coating compositions. Catechol could serve as a reactive diluent in such a formulation to effectively increase the non-volatile (or curable) solids content and decrease the proportion of fugitive organic solvent in the coating composition.

For synthesizing catechol-derived compounds (e.g. Structure I where $R_1$ is not H, and Structures II and III), several synthesis schemes can be envisioned as useful in this endeavor. While certain of these synthesis schemes will be described herein, further detail on such schemes can be found in the publication *Reactions of Catechol*, Crown Zellerback Corportion, Chemical Products Division, Camas, Wash. 98607 (Rev. January 1977) and publications cited in such pamphlet, the disclosures of which are expressly incorporated herein by reference. For example, one of the hydroxyl groups of catechol can be etherified, for example, with ethylene oxide, propylene oxide, or like oxide in the presence of ferric chloride or similar catalyst. Alternatively, such etherification reaction can be conducted using epichlorhydrin or similar material in the presence of catalytic amine hydrochloride. Such catechol adduct then is in ideal form for capping a polyester or similar polymer to provide a catechol-derived, phenol-functional polymer ideally suited in VPC coatings applications. Direct monoesters of catechol can be made only with careful control of pH or with careful preparation of catechol intermediate compounds. For example, benzoyl chloride can be reacted with catechol in aqueous reaction mixture in the presence of sodium hydroxide in order to maintain a pH of about 7.8 in order to produce a monobenzoate ester of catechol. Similarly, catechol can be reacted with thionyl chloride and pyridine in the presence of carbon disulfide to make catechol sulfite which then can be reacted with acetic acid or the like in pyridine to produce the mono-acetate ester of catechol in about 90% yield. Yet another scheme involves a formation of catechol carbonates wherein, for example, catechol is reacted with potassium hydroxide in isopropanol to make a mono-potassium salt of catechol. Conversion thereof into the carbonate of catechol then permits reaction with phosphorus pentachloride to give dichloromethylene ether of catechol which is useful in the synthesis of unusual aromatic carboxylic acids of catechol.

Regardless of the synthesis scheme chosen, such as described above, the resulting reactive groups on the catechol can be used in capping polymers or resins with the catechol-derivative for forming ideal VPC polymers or resins.

Preferably, though, the catechol molecules used to cap resins, structure (III), are linked through one of the carbon atoms of the aromatic ring so that the 1,2-hydroxy groups of the catechol molecule are preserved. Such linking can be achieved, for example, by conducting an alkylation of catechol using a conventional Friedel-Crafts reaction. Normally, mono substitution is achieved at the 4 position of the ring while di-substitution is accomplished at the 3 and 5 positions. Another procedure involves the halogenation of the ring carbon atoms. Further, the ring can be acylated directly using the Friedel-Crafts reaction or indirectly by a conventional Fries rearrangement. Moreover, carbonylation of catechol by the action of carbon dioxide on the alkali salt of catechol or by alkali metal bicarbonates thereof can be used to produce pyrocatechuic acid or 2,3-dihydroxyterephthalic acid. Still further, one may add an aldehyde group to the ring by conducting a Reimer-Tiemann reaction. As stated above, reference to the pamphlet cited above should be made for further details of these reactions.

The ring-substituted catechol-derivatives then can utilize such substituents attached to the ring in order to cap polymers or resins for use in VPC coating compositions, as those skilled in this art will appreciate.

A wide variety of acids and alcohols desirably can be used in synthesizing polyesters for capping by catechol or a catechol derivative as disclosed herein. Suitable carboxylic acids for this purpose include, for example, $C_2$–$C_{12}$ linear aliphatic dibasic acids; aromatic dicarboxylic acids such as isophthalic, orthophthalic, terephthalic acids and their anhydrides, where the formation of the anhydride is possible; trimellitic anhydride and the like; and the like and mixtures thereof. Suitable alcohols useful in polyester synthesis include, for example, glycols such as ethylene glycol, propylene glycol and the like; polyhydric alcohols such as trimethylolpropane, trimethylolethane, pentaerythritol, hexane diol, butane diol, glycerine, hexane triol, and the like in mixtures thereof; sterically hindered diols such as neopentyl glycol, cyclohexane dimethanol, and the like; and the like and mixtures thereof. Moreover, additional ingredients include propylene oxide, ethylene oxide, and the like; epoxide-containing materials such as epoxidized fatty compounds; acrylic copolymers containing copolymerized glycidyl acrylate and methacrylate units; and the like and mixtures thereof. Note that mono-functional acids or esters and alcohols may be used to terminate or cap the polyesters too. It will be appreciated that the foregoing list is merely representative of the wide variety of ingredients which can be used in designing carboxyl-functional or other appropriately functional (eg. isocyanate, etc.) polymers for reaction with catechol according to the precepts of the present invention.

Of importance in resin design in the present invention is that the phenol-functional compound be substantially free of reactive aliphatic hydroxyl groups. Aliphatic hydroxyl groups diminish the pot life of the coating composition as well as are slower to cure with the isocyanate curing agent in the presence of the catalyst. Thus, any aliphatic hydroxyl groups on the phenol-functional compound should be sufficiently shielded (sterically hindered) so that they are substantially unreactive or non-participatory in the isocyanate curing reaction.

Multi-isocyanate cross-linking agents cross link with the aromatic hydroxyl groups of the resulting adduct-capped polymer under the influence of a vaporous tertiary amine to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6$XDI) dicyclohexylmethane diisocyanate ($H_{12}$MDI), trimethylhexane diisocyanate, dimer acid diisocyanate (DDI), dicyclohexylmethane diisocyanate and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic poly-isocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the catechol-based compound to the isocyanate equivalents of the multi-isocyanate cross-linking agent should be greater than 1:1 and can range on up to about 1:2. The precise intended application of the coating composition often will dictate this ratio or isocyanate index. At high cross-linking densities or isocyanate equivalents, harder but relatively inflexible films are produced while at lower cross linking densities or isocyanate equivalents flexibility of the films increases. Optimizing the particular property or combination of properties desired can be determined as those skilled in this art will appreciate.

Usually a solvent or vehicle for the coating composition will be required and advantageously such solvent is a volatile organic solvent. Typical solvents include, for example, methyl ethyl ketone, acetone, methyl isobutyl ketone, ethylene glycol monoethyl ether acetate, xylene, toluene, and the like, and often mixtures thereof. The proportion of solvent, and hence the non-volatile solids content of the coating composition, depends upon factors including method of application, desired application viscosity, and the like factors.

A variety of additives can be included in the coating composition. The coating composition can contain opacifying pigments and inert extenders such as, for example, titanium dioxide, zinc oxide, clays such as kaolinite clays, silica, talc, and the like. Additionally, the coating composition can contain corrosion inhibiting pigments, plasticizers, flow leveling agents, surfactants, tinctorial pigments, and a wide variety of conventional coating additives.

The coating composition of the present invention can be cured in the presence of a tertiary amine such as, for example, triethylamine, dimethyl ethyl amine, dimethyl cyclohexyl amine, methyl diethyl amine, and the like, by exposure thereto for times ranging from as short as 5 seconds on up to 30 seconds or longer. The coating composition thus cured may be immediately handled without fear of tackiness or blocking of the cured film.

In practicing the present invention, the coating composition is applied to the substrate by direct roll coat or curtain coating with or without knife, reverse roller coat, atomized application, or like conventional technique. Use of two-head spray equipment is unnecessary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as for minimizing the chance of explosion. The saturated atmosphere in the curing chamber normally will contain the vaporous tertiary amine in a proportion of between about 2% and 12% with catalyst concentrations somewhere in the range of 4-8% being preferred. Room temperature may be maintained during the entire sequence of operations from coating to curing of the coated substrate. An advantage of room temperature curing of the coating is that application to thermoplastic substrates which are sensitive to heat can be practiced. In this regard, substrates suitable for being coated by the coating composition of the present invention include, for example, metal, thermoplastic resins, hardboard or fiberboard, wood, paper, thermosetting resins, and the like.

The following examples show how the present invention can be practiced but should not be construed as limiting. In this application all units are in the metric system unless otherwise expressly indicated. Also, all references cited herein are expressly incorporated herein by reference.

EXAMPLE 1

In order to demonstrate the criticality of the position of the two hydroxy groups on the benzene ring, the following formulations were compounded:

| Ingredient | Formulation (gms) | | |
|---|---|---|---|
| | A | B | C |
| 1,2-Dihydroxybenzene | 55 | — | — |
| 1,3-Dihydroxybenzene | — | 55 | — |
| 1,4-Dihydroxybenzene | — | — | 55 |
| Mondur MR Curing Agent[1] | 133 | 133 | 133 |
| Cellosolve Acetate Solvent | 55 | 55 | 55 |

[1] Mondur MR curing agent is a polymeric diphenylmethane diisocyanate of Mobay Chemical Corporation, Pittsburgh, Pa.

To each of the formulations was added one gram of liquid triethylamine catalyst and the resulting blend mixed. Formulations B and C still were liquid after more than 5 minutes following the catalyst addition at room temperature. Formulation A, however, gelled within about 3 seconds following the catalyst addition at room temperature. Clearly, the criticality of the position of the hydroxy groups and the uniqueness of catechol in demonstrated.

EXAMPLE 2

Three coatings formulations were compounded and subjected to a VPC process. The coatings formulations were as follows:

| Ingredient | Formulations (gms) | | |
|---|---|---|---|
| | 1 | 2 | 3 |
| Catechol | 22 | 15.85 | 9.1 |
| Mondur MR Isocyanate[1] | 56 | — | — |
| Isonate 226 Isocyanate[2] | — | 68.3 | — |
| Multrathane E-410 Isocyanate[3] | — | — | 81.8 |
| Cellosolve Acetate[4] | 22 | 15.85 | 9.1 |

[1] Mondur MR isocyanate is a polymeric diphenylmethane diisocyanate, equivalent weight of 133, Mobay Chemical Corporation, Pittsburgh, Pa.
[2] Isonate 226 isocyanate is modified diphenylmethane diisocyanate, equivalent weight of 226, Upjohn Polymer Chemicals, La Porte, Texas.
[3] Multrathane E-410 isocyanate is a diphenylmethane diisocyanate terminated polyester prepolymer, equivalent weight of 470, Mobay Chemical Corp. (supra).
[4] Cellosolve acetate is ethylene glycol monoethyl ether acetate (urethane grade), Union Carbide Corporation, New York, New York.

Each coating was formulated at an isocyanate index of 1.05. Each coating possessed a pot life of at least eight hours. Films were cast on glass with a 2 mil doctor blade and cured in a VPC chamber with triethylamine catalyst. Each coating cured upon only 30 seconds exposure to the vaporous amine catalyst.

The films were slightly colored and transparent. Mar resistance and other performance properties were minimal since these formulations were intended only to demonstrate curability via VPC techniques. Formulation 3, however, was converted to an attractive matte finish upon application of heat (70° C. for 2 minutes) to the cured film.

EXAMPLE 3

Two moles of monohydroxy ethyl catechol (MHEC, prepared from catechol and ethylene oxide) was heated with one mole of fumaric acid at 210° C. until the acid value was under 10. The resin then was vacuum stripped and cooled to 150° C. The vacuum was broken and the resin was diluted to 50% solids with dimethyl sulfoxide (DMSO) and filtered. The resulting solution had a hydroxyl number of 144.6 and an acid number of 5.

40 grams of this resin solution was mixed with 40.2 grams of Mondur HC isocyanate (tetrafunctional reaction product of hexamethylene diisocyanate and toluene diisocyanate, 11.5% NCO content, equivalent weight of 365, 60% solids in Cellosolve acetate/xylene, Mobay Chemical Company, Pittsburgh, Pa.) at an isocyanate index of 1.1, and the resulting solution was cut back to 125 cps with additional DMSO. This resulting coating composition was drawn down on glass as a one mil thick film using a doctor blade applicator and was subjected to the VPC curing conditions of Example 2. The resulting film cured at ambient temperature in 30 seconds. The uncured solution or coating composition was noted to still be liquid after overnight storage in a capped bottle.

We claim:

1. A method for coating a substrate with a coating composition which comprises:
   (a) applying a film of said coating composition to said substrate, said coating composition comprising an aromatic hydroxyl-functional compound comprising substituted or unsubstituted 1,2-dihydroxybenzene or derivatives thereof and a multi-isocyanate curing agent therefor, at least one of said aromatic hydroxyl-functional compound or said curing agent being polymeric; and
   (b) exposing said coated substrate to a vaporous tertiary-amine catalyst to rapidly cure said applied film.

2. The method of claim 1 wherein said curing agent contains between about 10% and 100% of an aromatic multi-isocyanate.

3. The method of claim 1 wherein said exposing of step (b) is at room temperature.

4. The method of claim 1 wherein the molar ratio of aromatic hydroxyl groups of said 1,2-dihydroxybenzene to the isocyanate groups of said curing agent is between about 1:1 and 1:2.

5. The method of claim 1 wherein said aromatic hydroxyl-functional compound comprises a 1,2-dihydroxybenzene derivative represented by:

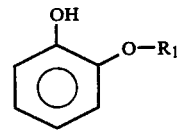

where $R_1$ is H or an organic group.

6. The method of claim 5 wherein said derivative is represented by:

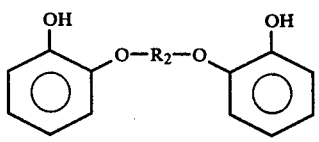

wherein $R_2$ is a divalent organic group.

7. The method of claim 6 wherein $R_2$ is a divalent polyester group.

8. The method of claim 1 wherein said aromatic-hydroxyl functional compound comprises a 1,2-dihydroxybenzene derivative represented by:

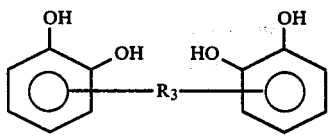

(III)

where $R_3$ is a divalent organic group.

9. The method of claim 1 wherein said coating composition also comprises a volatile organic solvent.

10. A coating composition rapidly curable at room temperature in the presence of a vaporous tertiary amine catalyst which comprises:

(a) an aromatic hydroxyl-functional compound comprising substituted or unsubstituted 1,2-dihydroxybenzene or a derivative thereof; and (b) a multi-isocyanate curing agent containing at least about 10% aromatic multi-isocyanate content by weight, at least one of said aromatic hydroxy-functional compound or said curing agent being polymeric.

11. The coating composition of claim 10 wherein said aromatic hydroxyl-functional compound comprises a 1,2-dihydroxybenzene derivative represented by:

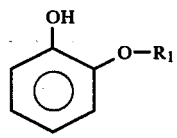

where $R_1$ is H or an organic group.

12. The coating composition of claim 11 wherein said derivative is represented by:

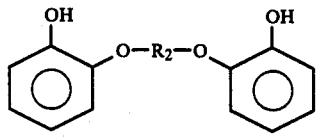

where $R_2$ is a divalent organic group.

13. The coating composition of claim 12 wherein $R_2$ is a divalent polyester group.

14. The coating composition of claim 10 wherein said multi-isocyanate curing agent contains between about 10% and 80% of an aromatic multi-isocyanate and between 90% and 20% of an aliphatic multi-isocyanate.

15. The coating composition of claim 10 wherein the molar ratio of aromatic hydroxyl groups of said compound to the isocyanate groups of said curing agent is between about 1:1 and 1:2.

16. The coating composition of claim 10 which has a pot life of at least about 4 hours in an open pot at room temperature.

17. The coating composition of claim 10 wherein said aromatic hydroxyl-functional compound comprises a 1,2-dihydroxybenzene derivative represented by:

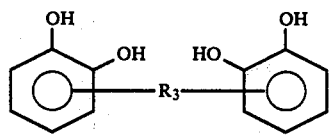

(III)

where $R_3$ is a divalent organic group.

18. The coating composition of claim 10 which additionally comprises (c) an organic solvent.

* * * * *